US012446916B2

United States Patent
Ojeda et al.

(10) Patent No.: US 12,446,916 B2
(45) Date of Patent: Oct. 21, 2025

(54) MULTI-PHASIC HANDPIECE FOR EXCISION OF HAIR GRAFTS

(71) Applicant: Mamba Instruments S.A., Asuncion (PY)

(72) Inventors: Ronald David Benitez Ojeda, Asuncion (PY); Luis Roberto Trivellini, Malaga (ES); Parsa Mohebi, Woodland Hills, CA (US)

(73) Assignee: Mamba Instruments S.A., Asunción (PY)

( * ) Notice: Subject to any disclaimer, the term of this patent is extended or adjusted under 35 U.S.C. 154(b) by 182 days.

(21) Appl. No.: 18/365,477

(22) Filed: Aug. 4, 2023

(65) Prior Publication Data

US 2025/0040958 A1    Feb. 6, 2025

(51) Int. Cl.
*A61B 17/322* (2006.01)
*A61B 17/00* (2006.01)

(52) U.S. Cl.
CPC .. *A61B 17/322* (2013.01); *A61B 2017/00022* (2013.01)

(58) Field of Classification Search
CPC ............ A61B 17/322; A61B 17/32053; A61B 2017/00022; A61B 2017/320064; A61B 2017/3225; A61B 2017/00747; A61B 2017/00761
See application file for complete search history.

(56) References Cited

U.S. PATENT DOCUMENTS

| | | | |
|---|---|---|---|
| 2005/0096687 A1 | 5/2005 | Rassman et al. | A61B 17/34 |
| 2011/0224693 A1 | 9/2011 | Bodduluri et al. | A61B 17/00 |
| 2014/0031839 A1 | 1/2014 | Umar et al. | A61B 17/3205 |
| 2017/0065291 A1 | 3/2017 | Lewallen | A61B 17/3205 |
| 2018/0161056 A1 | 6/2018 | Kim et al. | A61B 17/3205 |
| 2019/0201045 A1* | 7/2019 | Yates | G16H 50/20 |
| 2021/0145477 A1* | 5/2021 | Shaw | A61B 17/3478 |
| 2021/0244432 A1* | 8/2021 | Anderson | A61B 17/32053 |

OTHER PUBLICATIONS

International Search Report and Written Opinion dated Nov. 14, 2024 in counterpart PCT/US2024/040592.

* cited by examiner

*Primary Examiner* — Anh T Dang
(74) *Attorney, Agent, or Firm* — Venable LLP (57) ABSTRACT

An extraction device, including a motor, a driveshaft operatively coupled to the motor and driven to rotate thereby, a punch tool directly coupled to a distal end of the driveshaft to rotate therewith, and arranged to be in physical contact with a skin layer during operation of the extraction device, a force sensor operatively coupled to the driveshaft to measure a force exerted thereupon by the skin layer, and a controller communicatively coupled to the motor and to the force sensor. The controller is configured to define multiple rotary modes and multiple multiphasic modes, each multiphasic mode including at least two rotary modes, receive a selection of a multiphasic mode, and provide, based on the selection, a control signal to the motor instructing the motor to operate in the multiphasic mode.

22 Claims, 10 Drawing Sheets

MULTI-PHASIC HANDPIECE FOR EXCISION OF HAIR GRAFTS

BACKGROUND

1. Technical Field

Currently claimed embodiments described herein relate to extraction of follicular units in connection with hair transplant surgery.

2. Discussion of Related Art

FUE (Follicular Unit Extraction) is a surgical technique that removes individual follicular units, one by one, from an area of the skin to implant them at recipient sites, usually in bald areas of the scalp. This method is less invasive than the older methods used, which often involve removal of a strip of skin from the donor area of the scalp.

The use of motorized systems facilitates the extraction of the grafts. In the FUE method, it is necessary for the user to support the punch, which is held inside a handpiece, in order to make the cut or incision. The punch can vary in size from 0.60 mm to 1.20 mm in diameter and is used to cut the different layers of the skin and extract the follicular unit for subsequent placement in the recipient area.

Once the different layers of the skin are cut, they have different consistencies and characteristics for each particular case. Currently the user supports the handpiece and according to the force exerted by the user, he decides when to operate the handpiece to perform the extractions.

Because of the above mentioned, the performance of a FUE surgery depends almost entirely on how much experience the professional who is using the equipment has in manually gauging the force to be applied at each point of the extraction in order to perform a successful surgery.

SUMMARY

It has recently been considered to provide diverse control over movement of the punch by the extraction handpiece. Such control can offer a combination of movements (rotation, vibration, oscillation, and so forth) which allows the machine to adapt to each particular case. This is referred to as a Multiphasic FUE System.

Multiphasic FUE systems have programs that change the force of rotation or oscillation as the punch moves through the different layers of the scalp. Multiphasic graft extraction has been a revolution in hair transplantation. It can increase extraction precision and maintain graft quality.

The operator of a multiphasic system requires a certain learning curve and experience to know how to set up the system according to different skin and hair characteristics. In addition, skin thickness and density can change from one area of the scalp to another, so several adjustments may be necessary during a procedure to obtain optimal results.

According to an embodiment described herein, an extraction device includes a motor, a driveshaft operatively coupled to the motor and driven to rotate thereby, a punch tool directly coupled to a distal end of the driveshaft to rotate therewith, and arranged to be in physical contact with a skin layer during operation of the extraction device, a force sensor operatively coupled to the driveshaft to measure a force exerted thereupon by the skin layer, and a controller communicatively coupled to the motor and to the force sensor. The controller is configured to define a group of rotary modes, and define a group of multiphasic modes, each multiphasic mode including at least two rotary modes from the group of rotary modes. The controller is further configured to receive a selection of a multiphasic mode from the group of multiphasic modes, and provide, based on the selection, a control signal to the motor, the control signal instructing the motor to operate in the multiphasic mode.

According to an embodiment described herein, a method for follicle extraction by an extraction device includes defining a plurality of rotary modes and defining a group of multiphasic modes, each multiphasic mode comprising at least two rotary modes from the plurality of rotary modes. The method further includes receiving a selection of a particular multiphasic mode from the group of multiphasic modes, and providing, based on the selection, a corresponding control signal to a motor, the corresponding control signal instructing the motor to operate in the selected multiphasic mode. The motor is operatively coupled to a driveshaft to rotate the driveshaft, and further rotates a punch tool directly coupled to a distal end of the driveshaft to rotate therewith. The punch tool is arranged to be in physical contact with a skin layer during operation of the extraction device, and a force sensor is operatively coupled to the driveshaft to measure a force exerted thereupon by the skin layer.

BRIEF DESCRIPTION OF THE DRAWINGS

Further objectives and advantages will become apparent from a consideration of the description, drawings, and examples.

DETAILED DESCRIPTION

Some embodiments of the description herein are discussed in detail below. In describing embodiments, specific terminology is employed for the sake of clarity. It should be recognized, however, that the claims are not intended to be limited to the specific terminology so selected. A person skilled in the relevant art will recognize that other equivalent components can be employed, and other methods developed, without departing from the broad concepts of the description herein. All references cited anywhere in this specification, including the Background and Detailed Description sections, are incorporated by reference as if each had been individually incorporated.

As used herein, the term "punch" refers to a harvesting tool capable of removing or harvesting hair grafts, or follicular units containing one or more hair follicles. A punch may include a tubular body having a skin contacting cutting edge. In some embodiments, the punch may be mounted in a hand-held electric-powered tool (equivalently referred to as an extraction device) that causes the punch to rotate or oscillate as the cutting edge is brought into contact with the donor site. In some embodiments, the punch may be used manually.

As used herein, the term "motor" is defined as a machine that supplies motive power for a device with moving parts. The motor may be an electric motor, a pneumatic motor, a hydraulic motor, and so forth.

As used herein, the term "force sensor" is defined as a transducer that converts an input mechanical load, weight, tension, compression, or pressure into an electrical output signal. The force sensor may be a strain gauge load cell type in some embodiments. In some embodiments, the force sensor may be another type, including but not limited to, a pneumatic, a hydraulic, a piezoelectric, an inductive, a capacitive, and a magnetoresistive sensor.

As used herein, the term "rotary mode" is defined as a spinning or circular movement of a device (e.g., a punch) around a central axis. The rotary mode may also be referred to as a rotary movement. The movement of the device during the rotary mode may be clockwise or counterclockwise. A movement that is constant in direction may be referred to as a rotational movement, with a rotational speed, which can also be expressed as a rotational frequency. A movement that alternates between a clockwise direction and a counterclockwise direction may be referred to as an oscillatory movement. The clockwise portion of the oscillatory movement may have a same rotational speed or a different rotational speed as the counterclockwise portion of the oscillatory movement. Other types of rotary modes may include, but are not limited to, random movements and vibrational movements.

As used herein, the term "multiphasic mode" refers to a combination of two or more rotary modes. In some embodiments, each rotary mode in the multiphasic mode has a duration time. As an example, a multiphasic mode may have two modes, a rotation mode followed by an oscillation mode. In this example, the rotation mode has a duration of 200 milliseconds (ms) and the oscillation mode has a duration of 300 ms, for a total incision time of 500 ms.

As used herein, the term "controller" is defined as a hardware device with a processor, or a software program executing on a processor, that manages or directs a flow of data between two or more entities. The controller is capable of controlling the motion of a motor in real time. The controller is also capable of reading and processing data from a sensor, including but not limited to a force sensor.

Some embodiments provide an extraction device that includes a force sensor capable of measuring in real time a reaction force exerted by the skin surface in resistance to an incision, and a controller capable of varying a motor in response to the measured force.

The capability to measure the axial force enables multiple applications. For example, in some embodiments, a rotary movement can be initiated based on the force applied to the skin. In other words, the amount of force necessary to apply to the skin can be defined, for the device to begin a specific rotary movement. As another example, as the device penetrates the skin during an excision, variations in the force exerted by the operator can be perceived, and the parameters of the rotary movement can be varied to adapt to these variations in real-time to achieve the desired result.

In some embodiments, as the device moves through different layers of tissue, changes in tissue consistency may be detected by the force sensor. The detected force may be registered by a controller that changes the actual force of the rotating/oscillating punch, adapting to the hardness of the skin. This allows the operator to be more consistent with graft extraction without the need to manually adjust the settings as the device passes through different parts of the donor site.

Figure 1A:
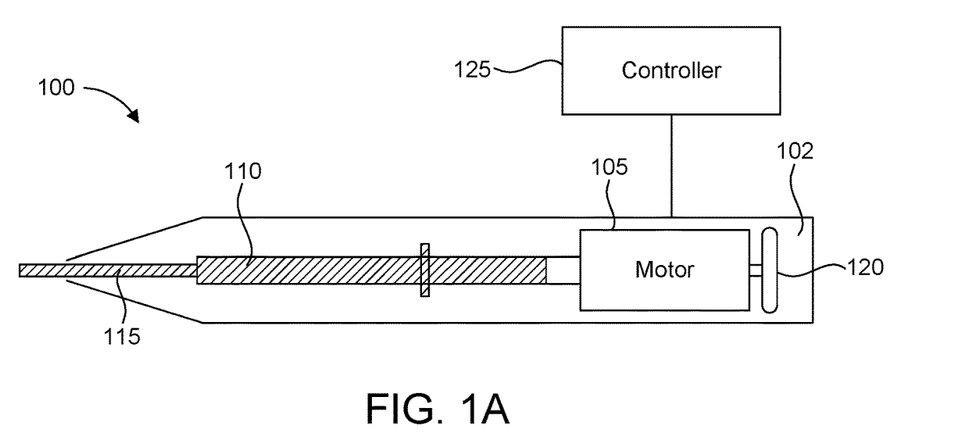
FIG. 1A shows an example of an extraction device of some embodiments.

FIG. 1A shows an example of an extraction device 100 of some embodiments. The extraction device 100 has a handpiece 102 that is grasped by a user during operation of the extraction device 100. The extraction device 100 has a motor 105 that drives a driveshaft 110 to rotate. In this example, the extraction device 100 is configured in a concentric motor-axis configuration, with the motor 105 being directly coupled to the driveshaft 110. A punch 115 is mounted to a distal end of the driveshaft 110, and rotates therewith, so that during operation of the extraction device 100, the punch 115 may be placed directly against a patient's skin (or skin layer thereof) to perform an incision.

The extraction device 100 also includes a force sensor 120. In this example, the force sensor 120 is directly coupled to the motor 105, and indirectly coupled to the driveshaft 110. The force sensor 120 is arranged to measure a force exerted upon the driveshaft 110 by the patient's skin during operation of the extraction device.

The extraction device 100 also includes a controller 125 communicatively coupled to the 105 and to the force sensor 120. As shown in the example of FIG. 1A, the motor 105, the driveshaft 110, and the force sensor 120 are arranged within the handpiece 102, and the punch 115 extends from the distal end of the driveshaft 110 to outside the handpiece 102, so as to come into contact with the patient's skin. The controller 125 in this example is located outside the handpiece 102, with a wired or wireless connection to the handpiece 102 and the components within (e.g., the motor 105 and the force sensor 120).

Figure 1B:
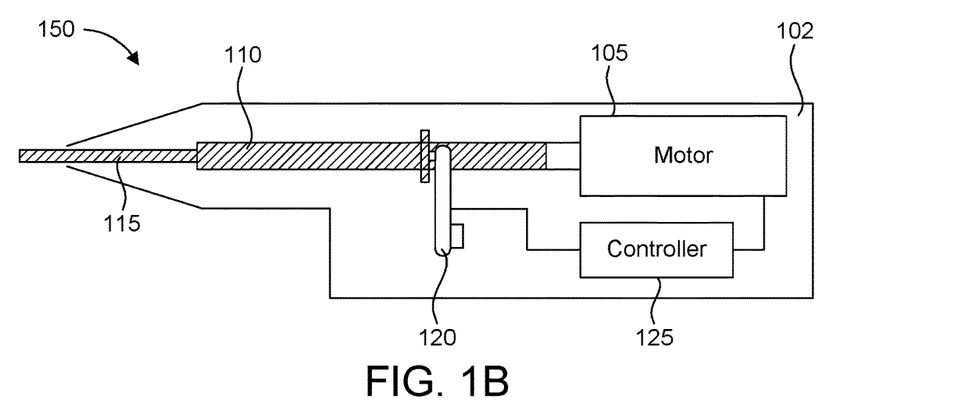
FIG. 1B shows another example of an extraction device, according to some embodiments.

FIG. 1B shows another example of an extraction device 150, according to some embodiments. The extraction device 150 is similar to the embodiment of the extraction device 100 discussed above with respect to FIG. 1A, and like reference numerals have been used to refer to the same or similar components.

The extraction device 150 is configured in a concentric motor-axis configuration, with the motor 105 being directly coupled to the driveshaft 110. In this example, the force sensor 120 is directly coupled to driveshaft 110, and measures a force exerted thereupon by the patient's skin during operation of the extraction device. The controller 125, the motor 105, the driveshaft 110, and the force sensor 120 are arranged within the handpiece 102, and the punch 115 extends from the distal end of the driveshaft 110 to outside the handpiece 102, so as to come into contact with the patient's skin.

Figure 1C:
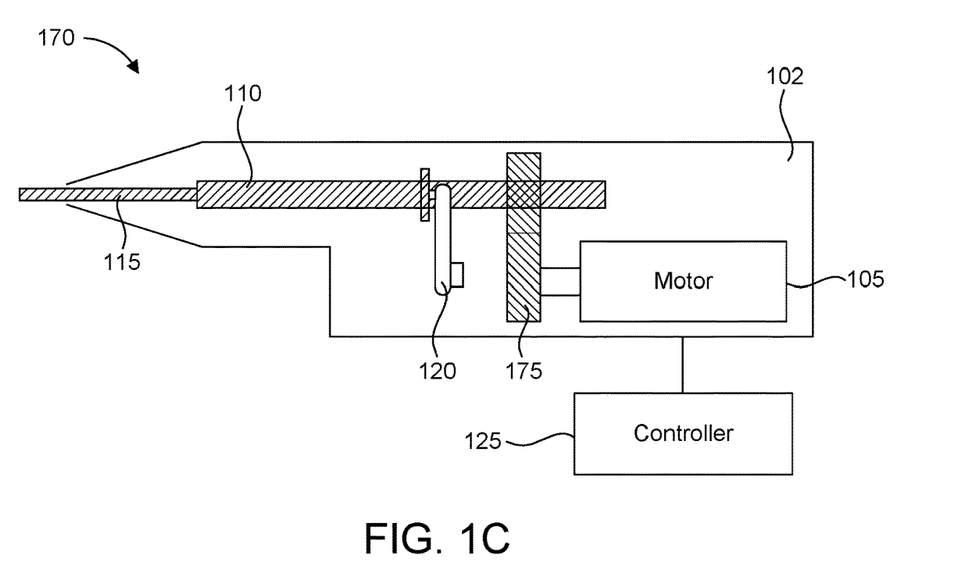
FIG. 1C shows another example of an extraction device, according to some embodiments.

FIG. 1C shows another example of an extraction device 170, according to some embodiments. The extraction device 170 is similar to the embodiments of the extraction device 100 and the extraction device 150, discussed above with respect to FIG. 1A and FIG. 1B, respectively, and like reference numerals have been used to refer to the same or similar components.

The extraction device 170 is configured in an eccentric motor-axis configuration, with the motor 105 being indirectly coupled to the driveshaft 110. In this example, the motor 105 is directly coupled to a gearset 175, and the gearset 175 is directly coupled to the driveshaft 110. In this example, the force sensor 120 is directly coupled to driveshaft 110. The motor 105, the driveshaft 110, and the force sensor 120 are arranged within the handpiece 102, and the punch 115 extends from the distal end of the driveshaft 110 to outside the handpiece 102, so as to come into contact with the patient's skin. The controller 125 in this example is located outside the handpiece 102, with a wired or wireless connection to the handpiece 102 and the components within (e.g., the motor 105 and the force sensor 120).

Figure 1D:
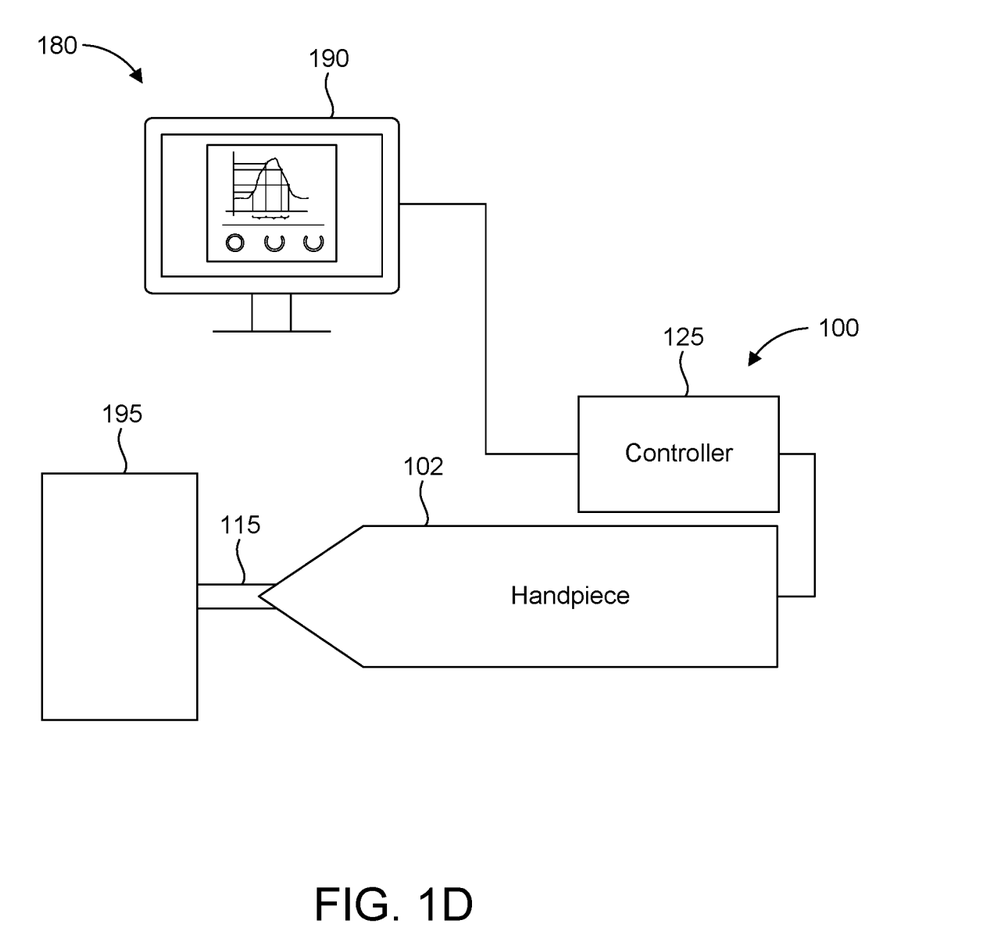
FIG. 1D shows an example of a system for follicular extraction.

FIG. 1D shows an example of a system 180 for follicular extraction. The system 180 includes the extraction device 170 and a user interface 190. The controller 125 of the extraction device 100 is communicatively coupled to the user interface 190.

Though the system 180 is shown here with the embodiment of extraction device 100, other embodiments of extraction devices may also be used, including but not limited to extraction device 150 and extraction device 170.

In this example, the user interface 190 includes a screen that displays information from the controller 125 and receives input from an operator (not shown) of the extraction device 170. The user interface 190 is configured to receive input from an operator of the extraction device 170, and provide that input to the controller 125, which then based on that input, controls the motor 105 to activate or deactivate the extraction device 170, switch between various operational modes (e.g., rotary modes and multiphasic modes), and provide real-time information to the operator about the status of the extraction device 170. In some embodiments, the user interface 190 includes but is not limited to one or more of a keyboard, a mouse, a foot pedal, a touchscreen, a display screen, or other device. In some embodiments, the user interface 190 may be a personal device (e.g., a cell phone) that connects to the controller 125 via a cable or via a wireless connection.

The controller 125 in the example of FIG. 1D is located outside the handpiece 102, with a wired or wireless connection to the handpiece 102 and the components within (e.g., the motor 105 and the force sensor 120, which are not shown in FIG. 1D). The punch 115 extends outside the handpiece 102, so as to come into contact with an exposed layer 195 of the patient's skin.

The system 180 may, in some embodiments, include a number of components, each of which may be implemented on a server or on an end-user device. In some cases, a subset of the components may execute on a user device (e.g., a mobile application on a cell phone, a webpage running within a web browser, a local application executing on a personal computer, and so forth) and another subset of the components may execute on a server (a physical machine, virtual machine, or container, and so forth, which may be located at a datacenter, a cloud computing provider, a local area network, and so forth).

The components of the system may be implemented in some embodiments as software programs or modules, which are described in more detail below. In other embodiments, some or all of the components may be implemented in hardware, including in one or more signal processing and/or application specific integrated circuits. While the components are shown as separate components, two or more components may be integrated into a single component. Also, while many of the components' functions are described as being performed by one component, the functions may be split among two or more separate components.

Figure 2:
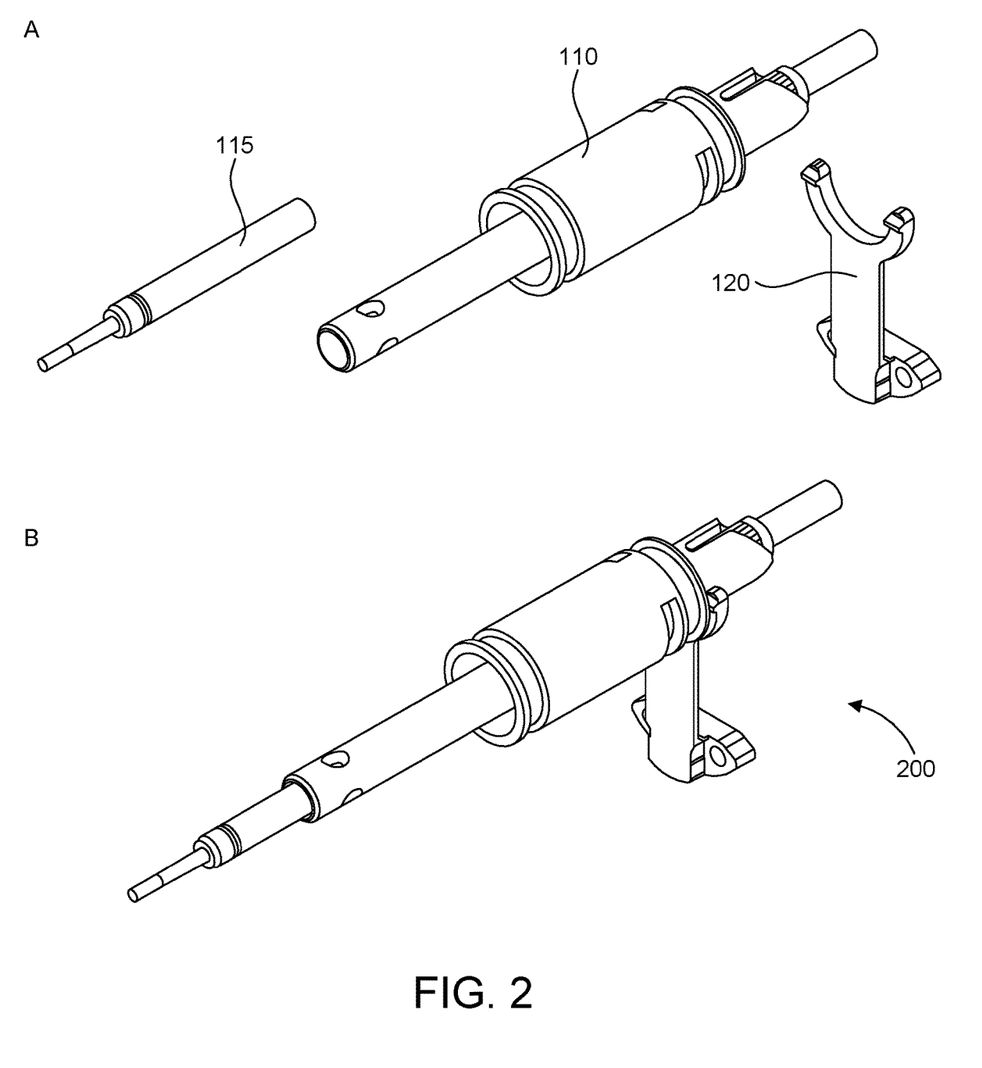
FIG. 2 shows an example of a drive assembly for an extraction device, according to some embodiments.

FIG. 2 shows an example of a drive assembly 200 for an extraction device, according to some embodiments. The drive assembly 200 includes the driveshaft 110, the punch 115, and the force sensor 120. An exploded view of the drive assembly 200 is shown in (A) and a complete view of the drive assembly 200 is shown in (B). In this example, the force sensor 120 is a load cell type force sensor. The force sensor 120 is directly coupled to the driveshaft 110, as shown in the examples of extraction device 150 and extraction device 170 described above with reference to FIG. 1B and FIG. 1C, respectively.

Figure 3:
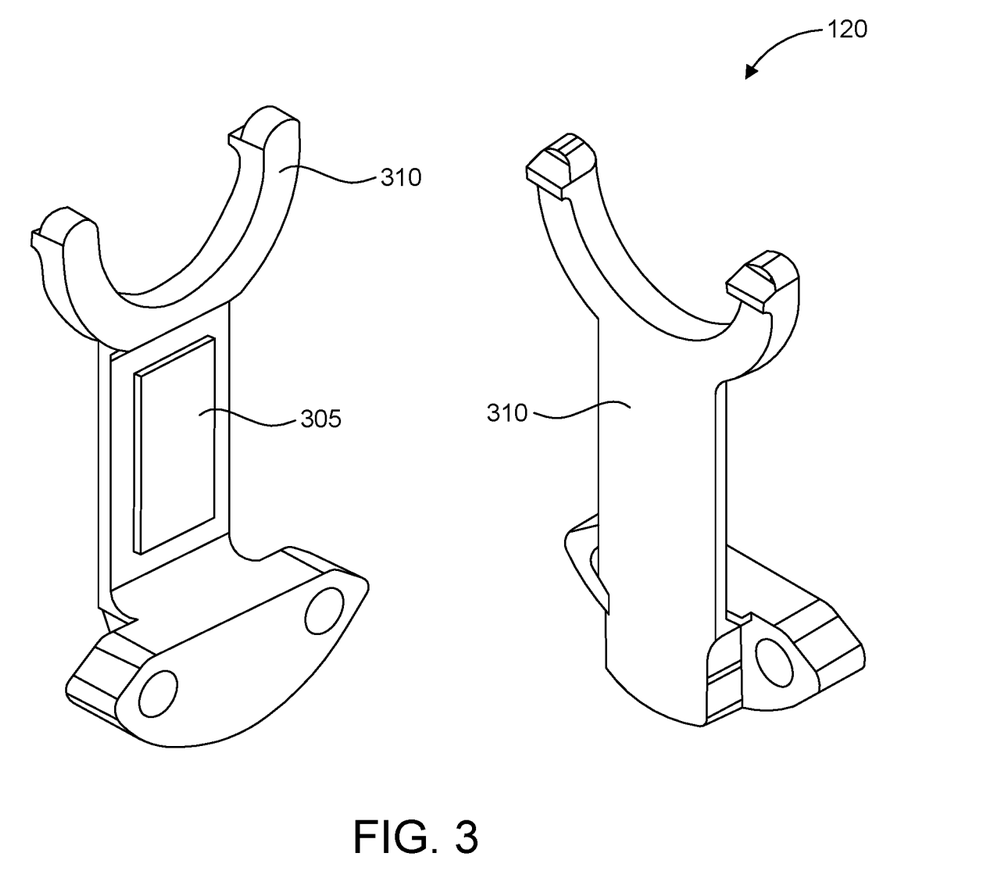
FIG. 3 shows detail views of the force sensor from FIG. 2.

FIG. 3 shows detail views of the force sensor 120 from FIG. 2. The force sensor 120 is a load cell assembly, with an elastic member 310 and a strain gauge 305. The strain gauge 305 may be connected to a controller 125 (not shown in FIG. 3) by a wired connection or a wireless connection.

Figure 4:
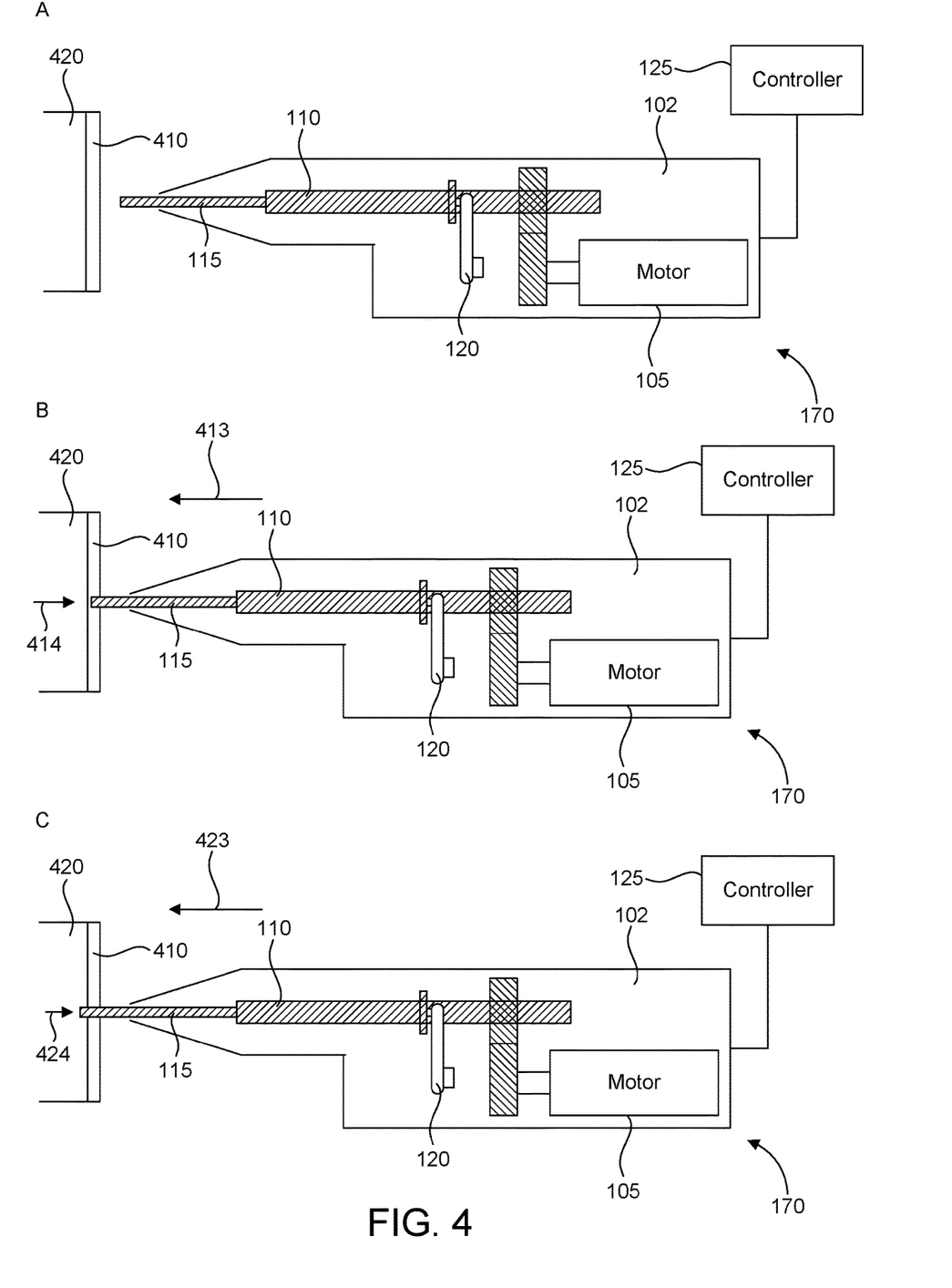
FIG. 4 shows various stages of operation of an extraction device, according to some embodiments described herein.

FIG. 4 shows various stages of operation of an extraction device 170, according to some embodiments described herein. This example uses the embodiment of extraction device 170, though extraction device 100, extraction device 150, or other embodiments may also be used.

In the first stage (A), the extraction device 170 is not yet operational, being positioned so that the punch 115 is not yet in contact with the outermost skin layer 410 of the patient's skin. Since there is no contact, there is no force being exerted on the skin layer 410 by the extraction device 170, and there is no reaction force being exerted on the extraction device 170 by the skin layer 410. In this state, the motor 105 may or may not be turning the driveshaft 110 and punch 115 in a rotary mode.

In the second stage (B) the extraction device 170 has made an incision to the skin layer 410. The punch 115 exerts a force 413 upon the skin layer 410, being driven forward by an operator of the extraction device 170. A reaction force 414 is also exerted by the skin layer 410 upon the punch 115, and subsequently transferred to the driveshaft 110, and then to the force sensor 120. The force sensor 120 perceives the reaction force 414, makes a measurement of the reaction force 414, and communicates the measurement to the controller 125. The reaction force 414 is analyzed by the controller 125 so that the controller 125 can vary the rotary mode of the extraction device 170.

Since the extraction device 170 is being driven by the operator forward through the skin layer 410, the force 413 exceeds the reaction force 414. In some embodiments, after the punch 115 goes to a certain depth, the operator may pull back the handpiece 102 to restart the process at a later time.

In the third stage (C) the extraction device 170 has fully penetrated skin layer 410 and has made an incision to the underlying skin layer 420. The punch 115 exerts a force 423 upon the skin layer 420, being driven forward by the operator of the extraction device 170. A reaction force 434 is also exerted by the skin layer 420 upon the punch 115, and subsequently transferred to the driveshaft 110, and then to the force sensor 120. The force sensor 120 perceives the reaction force 434, makes a measurement of the reaction force 434, and communicates the measurement to the controller 125. The reaction force 434 is analyzed by the controller 125 so that the controller 125 can vary the rotary mode of the extraction device 170.

Since the extraction device 170 is being driven by the operator forward through the skin layer 410, the force 423 exceeds the reaction force 424. Moreover, the reaction force 414 may be different than the reaction force 424 since the outer layer 410 has different physical characteristics than the subsequent skin layer 420. In some embodiments, after the punch 115 goes to a certain depth, the operator may pull back the handpiece 102 to restart the process at a later time.

As seen in (B) and (C), the reaction forces (e.g., reaction force 414 and reaction force 424) may vary depending on the skin consistency or the level of applied force by the operator. The skin consistency may vary based on the physical and biological characteristics of each layer. In addition, the reaction forces may vary based on the parameters of the rotary mode (e.g., rotation, oscillation, and so forth).

Figure 5:
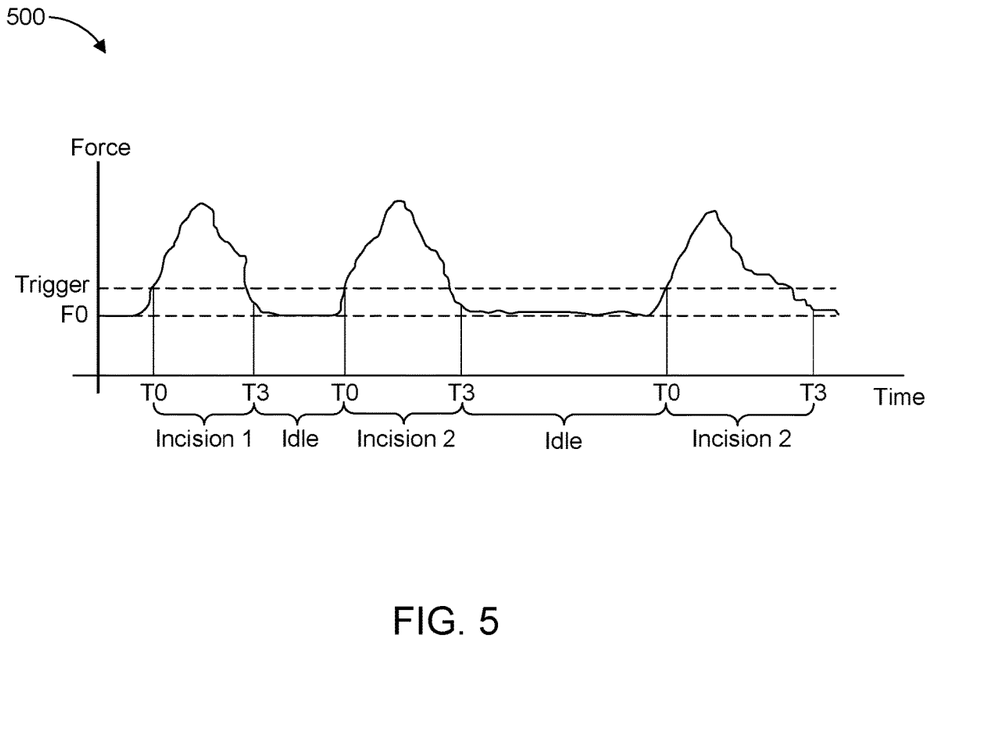
FIG. 5 shows a graph of reaction force measured by a force sensor over time during a series of incisions using extraction device, according to some embodiments.

FIG. 5 shows a graph 500 of reaction force measured by a force sensor 120 over time during a series of incisions using extraction device 170, according to some embodiments. This example uses the embodiment of extraction device 170, though extraction device 100, extraction device 150, or other embodiments may also be used. The reaction force F0 is the idle reaction force measured by the force sensor 120 when the extraction device 170 is not being driven forward by an operator. The operator presses the extraction device 170 firmly against the outer skin layer, which increases the reaction force until at time T0 the reaction force exceeds a trigger threshold. When the controller 125 determines (based on real-time measurement from the force sensor 120) that the force has exceeded the trigger threshold, the controller 125 activates the motor 105 to begin the first incision. During the first incision, the controller 125 adjusts the rotary mode of the extraction device 170 based on the measured reaction force. The first incision ends at time T3, after which the extraction device 170 is idle, until the operator applies the extraction device to another location of the patient's skin to begin another incision. The force profile of each incision may be similar but not identical since each incision may encounter different skin environments.

In some embodiments, different rotary modes correspond to different types of skin layers. A given multiphasic mode may be selected by the operator based on various factors, including but not limited to the type of skin of the patient, different characteristics of follicular units that are to be extracted, and different skin locations of the follicular units to be extracted.

In some embodiments, the controller 125 is configured to define multiple multiphasic modes, each of which includes two or more rotary modes. Rotary modes may be characterized by various parameters, including but not limited to a type (e.g., rotation, oscillation, vibration, and so forth), a duration (e.g., a maximum duration), and a rotational speed. The controller 125 may be configured to receive a selection of a particular multiphasic mode from a menu of available multiphasic modes, and provide, based on the selection, control signals to the motor 105.

During operation in a selected multiphasic mode, the controller 125 receives a sensor signal in real-time from the force sensor 120, indicating a level of reaction force being measured. Based on the sensor signal, the controller 125 may select a rotary mode, e.g., by performing a lookup against a database, or using a trained model. Based on the selection, the controller 125 provides a control signal to the motor 105, instructing the motor to operate in the first rotary mode. As the incision continues, the controller 125 continues to monitor the measured force from the force sensor 120, and at a different level of force, select a different rotary mode, and provide a different control signal to the motor 105 accordingly.

In some embodiments, during the incision, the controller 125 also provides real-time information to the user interface 190 on the available and active rotary modes of the multiphasic mode. This information includes, but is not limited to, the type of rotary mode, the rotational speed for each rotary mode, and for oscillation modes, the angle of oscillation (e.g., in units of degrees).

In some embodiments, the rotational speed may be displayed on the user interface 190 in various ways, including but not limited to a rotational frequency (e.g., in units of Hz), a rotational speed (e.g., in units of meters per second), and a percentage of maximum speed.

Another type of information that may be provided to the user interface 190 is a mode activation time (e.g., in units of milliseconds, or "ms"). The mode activation time is a safety feature that defines the maximum time a rotary mode should actuate, if the threshold force is not reached. For example, the controller 125 may monitor the duration of each rotary mode and if the time a rotary mode has been active exceeds the mode activation time, deactivates that rotary mode.

Figure 6:
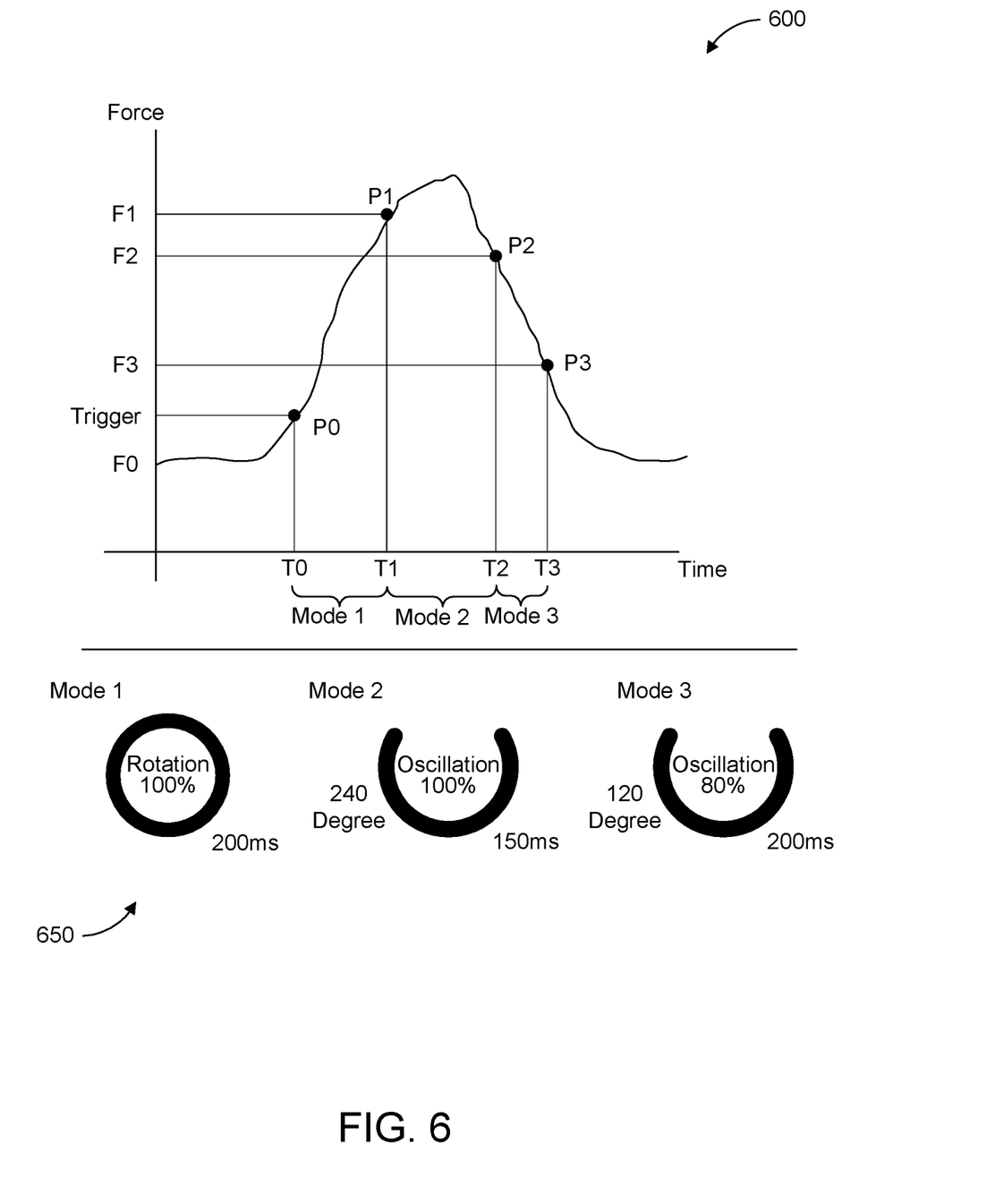
FIG. 6 shows a graph of measured reaction force over time for a sample incision made with the extraction device for a selected multiphasic mode.

FIG. 6 shows a graph 600 of measured reaction force over time for a sample incision made with the extraction device 170 for a selected multiphasic mode. The selected multiphasic mode in this example includes three rotary nodes. In this example, the graph 600 is displayed on the user interface 190, generated by the controller 125.

The graph 600 indicates that a first rotary mode ("Mode 1") begins at time T0 when the measured reaction force reaches the trigger force and finishes at time T1 when the force F1 is reached, ending Mode 1 and starting the second rotary mode ("Mode 2"). Mode 2 finishes at time T2 when force F2 is reached, starting a third rotary mode ("Mode 3") which ends at time T3 when the force reaches F3.

In this example, the points on the graph 600 at which each rotary mode begins and ends are labeled as points P0 (corresponding to the trigger force at time T0), P1 (corresponding to T1, F1), P2 (corresponding to T2, F2), and P3 (corresponding to T3, F3).

In the example of FIG. 6, the information about the rotary modes is shown in a dashboard 650 beneath the graph 600. This information corresponds to the presently active multiphasic mode. The dashboard 650 shows that Mode 1 rotates with 100% speed, Mode 2 oscillates with 100% speed at a 240-degree angle, and Mode 3 oscillates with 80% speed at 120 degree angle. In addition, Mode 1 has an activation time of 200 ms, Mode 2 has an activation time of 150 ms, and Mode 3 has an activation time of 200 ms. The dashboard 650 also shows the type of each mode using a circle for a rotational mode (Mode 1) and a semicircle for the oscillation modes (Modes 2 and 3).

Figure 7:
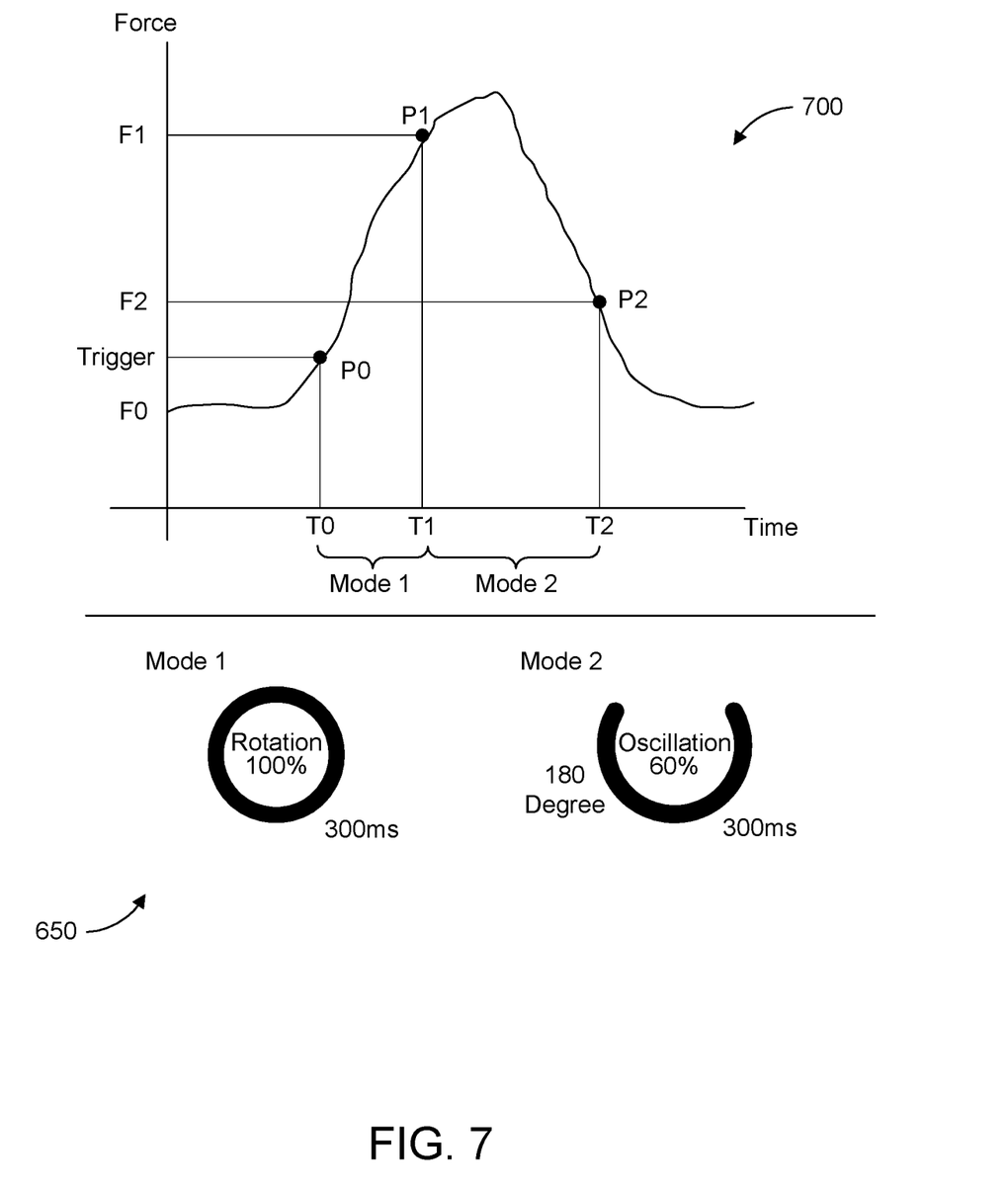
FIG. 7 shows a graph of measured reaction force over time for a sample incision made with the extraction device for another multiphasic mode.

FIG. 7 shows a graph 700 of measured reaction force over time for a sample incision made with the extraction device 170 for another multiphasic mode. The selected multiphasic mode in this example includes two rotary nodes. In this example, the graph 700 is displayed on the user interface 190, generated by the controller 125.

The graph 700 indicates that a first rotary mode ("Mode 1") begins at time T0 when the measured reaction force reaches the trigger force and finishes at time T1 when the force F1 is reached, ending Mode 1 and starting the second rotary mode ("Mode 2"). Mode 2 finishes at time T2 when force F2 is reached.

In this example, the points on the graph 700 at which each rotary mode begins and ends are labeled as points P0 (corresponding to the trigger force at time T0), P1 (corresponding to T1, F1), and P2 (corresponding to T2, F2).

In the example of FIG. 7, the information about the rotary modes is shown in a dashboard 750 beneath the graph 700. This information corresponds to the presently active multiphasic mode. The dashboard 750 shows that Mode 1 rotates with 100% speed, and Mode 2 oscillates with 60% speed at a 180-degree angle. In addition, Mode 1 has an activation time of 300 ms, and Mode 2 has an activation time of 300 ms. The dashboard 750 also shows the type of each mode using a circle for the rotational mode (Mode 1) and a semicircle for the oscillation mode (Modes 2).

Figure 8:
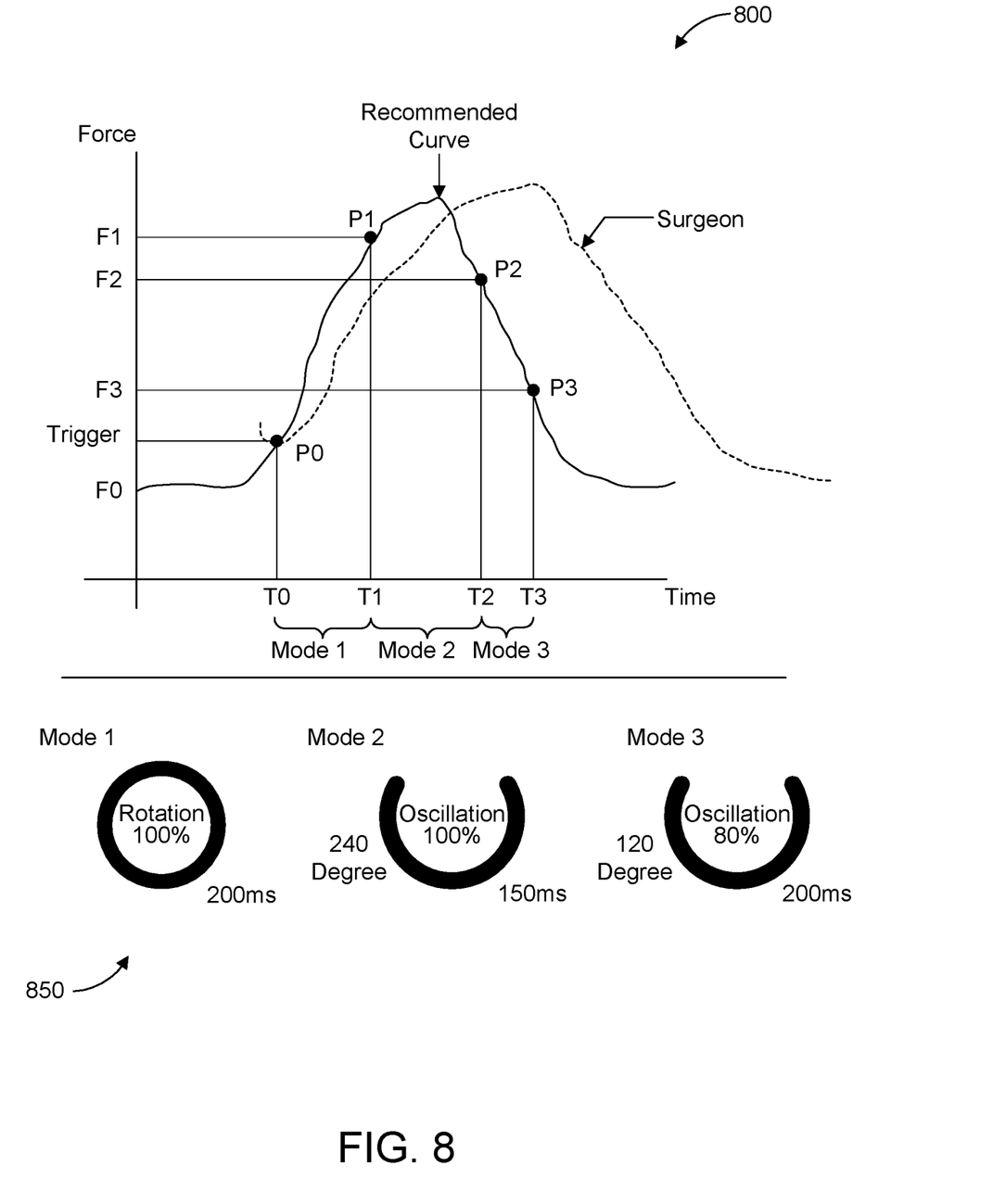
FIG. 8 shows a graph of measured reaction force over time for a sample incision made with the extraction device for a selected multiphasic mode.

FIG. 8 shows a graph 800 of measured reaction force over time for a sample incision made with the extraction device 170 for a selected multiphasic mode. The selected multiphasic mode in this example includes three rotary nodes. In this example, the graph 800 is displayed on the user interface 190, generated by the controller 125.

In this example, the graph 800 shows two graphs, a real-time graph 810 showing a measurement of force over time by an operator (e.g., a surgeon) of the extraction device 170, and a static overlay of a reference graph 820 showing an optimal curve of force over time. The reference graph 820 allows the operator to compare their incision process to the optimal excision indicated by the reference graph 820.

The reference graph 820 indicates that a first rotary mode ("Mode 1") began at time T0 when the measured reaction force reached the trigger force and finished at time T1 when the force F1 was reached, ending Mode 1 and starting the second rotary mode ("Mode 2"). Mode 2 finished at time T2 when force F2 was reached, starting a third rotary mode ("Mode 3") which ended at time T3 when the force reached F3.

In this example, the points on the reference graph 820 at which each rotary mode began and ended are labeled as points P0 (corresponding to the trigger force at time T0), P1 (corresponding to T1, F1), P2 (corresponding to T2, F2), and P3 (corresponding to T3, F3).

In the example of FIG. 8, the information about the rotary modes is shown in a dashboard 850 beneath the graph 800. This information corresponds to the presently active multiphasic mode, as shown on the real-time graph 810. The dashboard 850 shows that Mode 1 rotates with 100% speed, Mode 2 oscillates with 100% speed at a 240-degree angle, and Mode 3 oscillates with 80% speed at 120-degree angle. In addition, Mode 1 has an activation time of 200 ms, Mode 2 has an activation time of 150 ms, and Mode 3 has an activation time of 200 ms. The dashboard 850 also shows the type of each mode using a circle for a rotational mode (Mode 1) and a semicircle for the oscillation modes (Modes 2 and 3).

Advantages of some embodiments include reducing the amount of operator expertise required for follicular extraction, less training time for operators, and greater consistency in the quality of follicular unit grafts harvested. Some embodiments may increase the speed of harvesting and decrease the overall procedure time. The grafts may be consistently better, with minimal damage to the hair follicles (particularly at the root end), regardless of the areas from which they are harvested.

Figure 9:
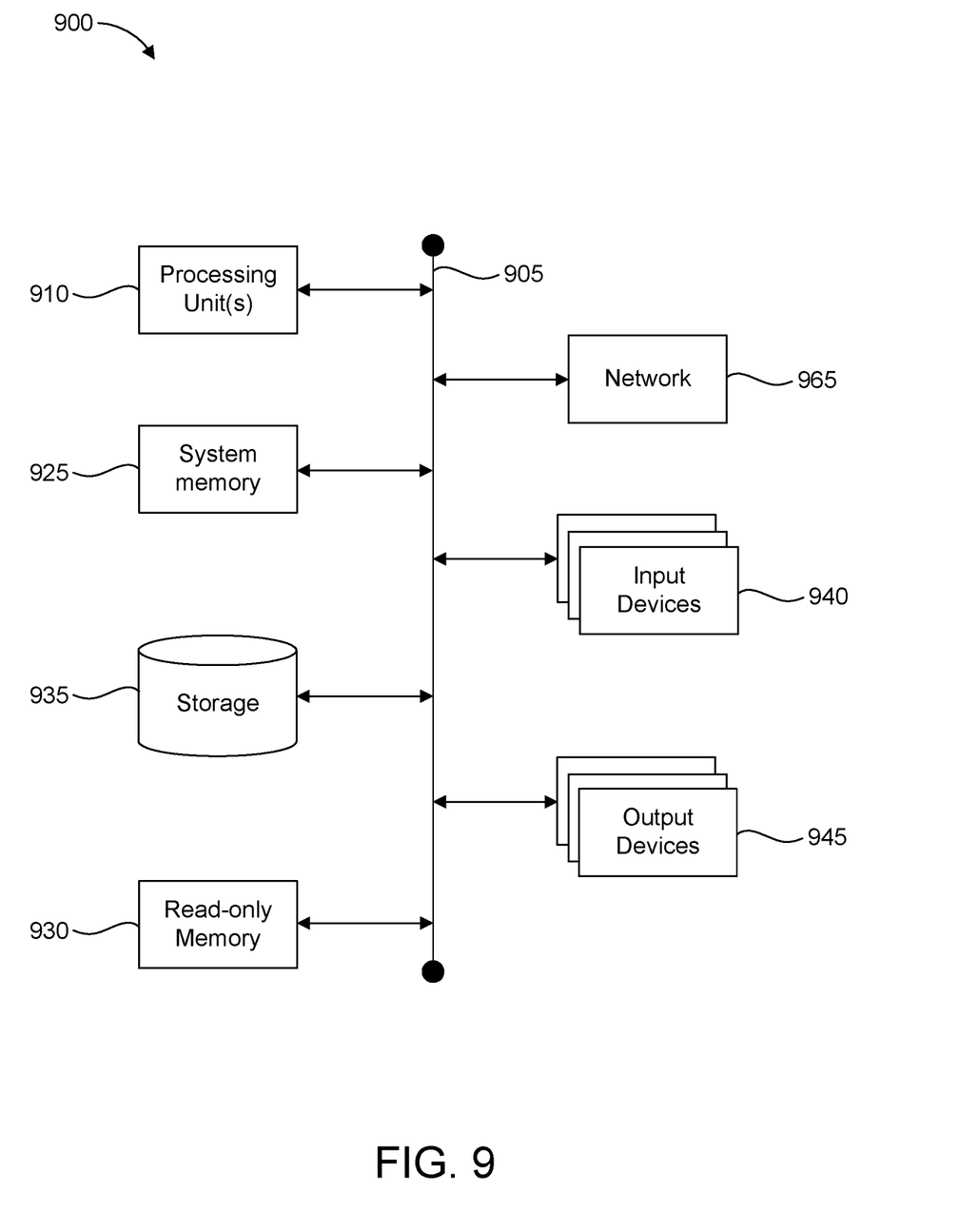
FIG. 9 conceptually illustrates an electronic system with which some embodiments described herein are implemented.

FIG. 9 conceptually illustrates an electronic system 900 with which some embodiments described herein are implemented. The electronic system 900 can be used to execute any of the control and/or compiler systems described above in some embodiments. The electronic system 900 may be a computer (e.g., a desktop computer, personal computer, tablet computer, server computer, mainframe, a blade computer and so forth), phone, PDA, or any other sort of electronic device. Such an electronic system includes various types of computer readable media and interfaces for various other types of computer readable media. Electronic system 900 may include one or more of a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to cause execution of the processes described herein. The processing unit(s) may be a single processor or a multi-core processor in different embodiments. In some embodiments, the instructions are executed by the processing unit(s) 910 to configure the controller 125 to receive signals from the force sensor, select a rotary mode or a multiphasic mode, provide control signals to the motor 105, and display indications on the user interface 190.

The read-only-memory 930 stores static data and instructions that are needed by the processing unit(s) 910 and other modules of the electronic system, such as the controller 125. The permanent storage device 935, on the other hand, is a read-and-write memory device. This device is a non-volatile memory unit that stores instructions and data even when the electronic system 900 is off. Some embodiments described herein use a mass-storage device (such as a magnetic or optical disk and its corresponding disk drive) as the permanent storage device 935.

Other embodiments use a removable storage device (such as a floppy disk, flash drive, and so forth) as the permanent storage device. Like the permanent storage device 935, the system memory 925 is a read-and-write memory device. However, unlike permanent storage device 935, the system memory is a volatile read-and-write memory, such a random-access memory. The system memory stores some of the instructions and data that the processor needs at runtime. In some embodiments, the computer-executable instructions for the processes described herein are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input devices 940 and output devices 945. As discussed above, the input devices 940 and the output devices 945 may in some embodiments be components of the user interface 190. The input devices enable the user to communicate information and select commands to components of the electronic system 180, including but not limited to embodiments of the extraction device 100, extraction device 150, and extraction device 170), and components thereof (e.g., the controller 125). The input devices 940 may include alphanumeric keyboards, foot pedals, and pointing devices (also called "cursor control devices"). In some embodiments, the input devices 940 include the force sensor 120. The output devices 945 may include screens that display images generated by the electronic system 180. The output devices may also include printers and display devices, such as cathode ray tubes (CRT) or liquid crystal displays (LCD). Some embodiments include devices such as a touchscreen that function as both input and output devices. In some embodiments, the output devices include the motor 105, the driveshaft 110, and the punch 115.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the description herein.

The terms "light" and "optical" are intended to have broad meanings that can include both visible regions of the electromagnetic spectrum as well as other regions, such as, but not limited to, infrared and ultraviolet light and optical imaging, for example, of such light.

As used in this specification, the terms "computer", "server", "processor", and "memory" all refer to electronic or other technological devices. These terms exclude people or groups of people. As used in this specification, the terms "computer readable medium," "computer readable media," and "machine readable medium," and so forth, are entirely restricted to tangible, physical objects that store information in a form that is readable by a computer. These terms exclude any wireless signals, wired download signals, and any other ephemeral signals.

The term "computer" is intended to have a broad meaning that may be used in computing devices such as, e.g., but not limited to, standalone or client or server devices. The computer may be, e.g., (but not limited to) a personal computer (PC) system running an operating system such as, e.g., (but not limited to) MICROSOFT® WINDOWS® available from MICROSOFT® Corporation of Redmond, Wash., U.S.A. or an Apple computer executing MAC® OS from Apple® of Cupertino, Calif., U.S.A. However, embodiments described herein are not limited to these platforms. Instead, embodiments may be implemented on any appropriate computer system running any appropriate operating system. For example, one illustrative embodiment may be implemented on a computer system operating as discussed herein. The computer system may include, e.g., but is not limited to, a main memory, random access memory (RAM), and a secondary memory, and so forth. Main memory, random access memory (RAM), and a secondary memory, and so forth, may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, and so forth.

The secondary memory may include, for example, (but not limited to) a hard disk drive and/or a removable storage drive, representing a floppy diskette drive, a magnetic tape drive, an optical disk drive, a read-only compact disk (CD-ROM), digital versatile discs (DVDs), flash memory (e.g., SD cards, mini-SD cards, micro-SD cards, and so forth), read-only and recordable Blu-Ray® discs, and so forth. The removable storage drive may, e.g., but is not limited to, read from and/or write to a removable storage unit in a well-known manner. The removable storage unit, also called a program storage device or a computer program product, may represent, e.g., but is not limited to, a floppy disk, magnetic tape, optical disk, compact disk, and so forth, which may be read from and written to the removable storage drive. As will be appreciated, the removable storage unit may include a computer usable storage medium having stored therein computer software and/or data.

In some embodiments, the secondary memory may include other similar devices for allowing computer programs or other instructions to be loaded into the computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to the computer system.

Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The computer may also include an input device may include any mechanism or combination of mechanisms that may permit information to be input into the computer system from, e.g., a user. The input device may include logic configured to receive information for the computer system from, e.g., a user. Examples of the input device may include, e.g., but not limited to, a mouse, pen-based pointing device, or other pointing device such as a digitizer, a touch sensitive display device, and/or a keyboard or other data entry device (none of which are labeled). Other input devices may include, e.g., but not limited to, a biometric input device, a video source, an audio source, a microphone, a web cam, a video camera, and/or another camera. The input device may communicate with a processor either wired or wirelessly.

The computer may also include output devices which may include any mechanism or combination of mechanisms that may output information from a computer system. An output device may include logic configured to output information from the computer system. Embodiments of output device may include, e.g., but not limited to, display, and display interface, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and so forth. The computer may include input/output (I/O) devices such as, e.g., (but not limited to) communications interface, cable and communications path, and so forth. These devices may include, e.g., but are not limited to, a network interface card, and/or modems. The output device may communicate with processor either wired or wirelessly. A communications interface may allow software and data to be transferred between the computer system and external devices.

The term "data processor" is intended to have a broad meaning that includes one or more processors, such as, e.g., but not limited to, that are connected to a communication infrastructure (e.g., but not limited to, a communications bus, cross-over bar, interconnect, or network, and so forth).

The term data processor may include any type of processor, microprocessor and/or processing logic that may interpret and execute instructions, including application-specific integrated circuits (ASICs) and field-programmable gate arrays (FPGAs). The data processor may comprise a single device (e.g., for example, a single core) and/or a group of devices (e.g., multi-core). The data processor may include logic configured to execute computer-executable instructions configured to implement one or more embodiments. The instructions may reside in main memory or secondary memory. The data processor may also include multiple independent cores, such as a dual-core processor or a multi-core processor. The data processors may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement embodiments falling within the scope of the claims using other computer systems and/or architectures.

The term "data storage device" is intended to have a broad meaning that includes removable storage drive, a hard disk installed in hard disk drive, flash memories, removable discs, non-removable discs, and so forth. In addition, it should be noted that various electromagnetic radiation, such as wireless communication, electrical communication carried over an electrically conductive wire (e.g., but not limited to twisted pair, CAT5, and so forth) or an optical medium (e.g., but not limited to, optical fiber) and the like may be encoded to carry computer-executable instructions and/or computer data that embodiments described herein on e.g., a communication network. These computer program products may provide software to the computer system. It should be noted that a computer-readable medium that comprises computer-executable instructions for execution in a processor may be configured to store embodiments falling within the scope of the claims.

The term "network" is intended to include any communication network, including a local area network ("LAN"), a wide area network ("WAN"), an Intranet, or a network of networks, such as the Internet.

The term "software" is meant to include firmware residing in read-only memory or applications stored in magnetic storage, which can be read into memory for processing by a processor. Also, some embodiments may be implemented as multiple software components as sub-parts of a larger program while remaining their distinct software identities. Some embodiments may also be implemented as separate software programs. Finally, any combination of separate programs that together implement software for performing processes described here is within the scope of the claims. In some embodiments, the software programs, when installed to operate on one or more electronic systems, define one or more specific machine implementations that execute and perform the operations of the software programs.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The embodiments illustrated and discussed in this specification are intended only to teach those skilled in the art how to make and use the invention. In describing embodiments described herein, specific terminology is employed for the sake of clarity. However, the claims are not to be limited to the specific terminology so selected. The above-described embodiments described herein may be modified or varied, without departing from the scope of the claims, as appreciated by those skilled in the art in light of the above teachings. It is therefore to be understood that, within the scope of the claims and their equivalents, particular embodiments may be practiced otherwise than as specifically described. For example, it is to be understood that the present disclosure contemplates that, to the extent possible, one or more features of any embodiment can be combined with one or more features of any other embodiment.

The invention claimed is:

1. An extraction device, comprising:
a motor;
a driveshaft operatively coupled to the motor and driven to rotate thereby;
a punch tool directly coupled to a distal end of the driveshaft to rotate therewith, and arranged to be in physical contact with a skin layer during operation of the extraction device;
a force sensor operatively coupled to the driveshaft to measure a force exerted thereupon by the skin layer; and
a controller communicatively coupled to the motor and to the force sensor,
wherein the controller is configured to:
define a plurality of rotary modes;
define a plurality of multiphasic modes, each multiphasic mode comprising at least two rotary modes from the plurality of rotary modes;
receive a selection of a particular multiphasic mode from the plurality of multiphasic modes; and
provide, based on the selection, a corresponding control signal to the motor, the corresponding control signal instructing the motor to operate in the selected multiphasic mode.

2. The extraction device of claim 1, wherein the selected multiphasic mode comprising a first rotary mode and a second rotary mode, and
wherein during operation of the device in the selected multiphasic mode, the controller is further configured to:
receive a first sensor signal from the force sensor;
perform a first selection of the first rotary mode from the plurality of rotary modes, the first selection being based on the first sensor signal;
provide, based on the first selection, a first control signal to the motor, the first control signal instructing the motor to operate in the first rotary mode;
receive a second sensor signal from the force sensor;
perform a second selection of the second rotary mode from the plurality of rotary modes, the second selection being based on the second sensor signal; and
provide, based on the second selection, a second control signal to the motor, the second control signal instructing the motor to operate in the second rotary mode.

3. The extraction device of claim 2, wherein each rotary mode in the plurality of rotary modes corresponds to a different type of skin layer.

4. The extraction device of claim 2, wherein the controller is further configured to:
perform a first determination, based on the first sensor signal, that the punch tool is in direct contact with a first skin layer type, the first selection of the first rotary mode being based on the first determination; and
perform a second determination, based on the second sensor signal, that the punch tool is in direct contact with a second skin layer type, the second selection of the second rotary mode being based on the second determination.

5. The extraction device of claim 4, wherein the first sensor signal is indicative of a first level of force exerted by the first skin layer type against the punch tool and the second sensor signal is indicative of a second level of force exerted by the second skin layer type against the punch tool.

6. The extraction device of claim 1, wherein the controller is communicatively coupled to a user interface, and
wherein the selection of a particular multiphasic mode is a user selection received through the user interface.

7. The extraction device of claim 6, wherein a currently active multiphasic mode comprises a plurality of available rotary modes,
the controller being further configured to provide to the user interface a plurality of indications, the plurality of indications comprising an indication of a real-time sensor signal, a real-time indication of the currently active multiphasic mode, a real-time indication of a currently active rotary mode from the plurality of available rotary modes from the selected multiphasic mode, and an indication of the plurality of available rotary modes, the user interface being further configured to display the at least one of the plurality of indications.

8. The extraction device of claim 7, wherein the plurality of indications further comprises:
a first graph of the real-time sensor signal as a function of elapsed time; and
a second graph of a pre-determined signal over time as an overlay to the first graph.

9. The extraction device of claim 6, wherein a currently active multiphasic mode comprises a plurality of available rotary modes,
wherein a first rotary mode in the plurality of available rotary modes has a maximum operation time, a start force threshold at which the first rotary mode is activated, and an end force threshold at which the first rotary mode is deactivated, and
the controller is further configured to:
receive a first measurement from the force sensor of a first force exerted upon the driveshaft by the skin layer;
make a first determination, based on the first measurement, that the first force has exceeded the start force threshold, and based on the first determination, activate the first rotary mode;
receive a second measurement from the force sensor of a second force exerted upon the driveshaft by the skin layer;
make a second determination, based on the second measurement, that the second force has fallen below the end force threshold, and based on the second determination, deactivate the first rotary mode;
make a third determination that the first rotary mode has been activated for longer than the maximum operation time, and based on the third determination, deactivate the first rotary mode; and
provide to the user interface a plurality of indications, the plurality of indications comprising an indication of the plurality of available rotary modes, and for each available rotary mode, the maximum operation time, the start force threshold, the end force threshold, the first measurement from the force sensor, and the second measurement from the force sensor, the user interface being further configured to display the at least one of the plurality of indications.

10. The extraction device of claim 1, wherein the plurality of rotary modes comprise:
a rotational movement in which the driveshaft rotates in a single direction at a designated rotational speed, the direction being one of a clockwise direction and a counter-clockwise direction, and
an oscillation movement in which the driveshaft alternates between rotating in a clockwise direction and a counterclockwise direction, through a designated angle of rotation at a designated rotational speed.

11. The extraction device of claim 1, wherein the force sensor is a load cell, the load cell comprising an elastic member and a strain gauge, the strain gauge being communicatively coupled to the controller.

12. A method for follicle extraction by an extraction device, comprising:
defining a plurality of rotary modes;
defining a plurality of multiphasic modes, each multiphasic mode comprising at least two rotary modes from the plurality of rotary modes;
receiving a selection of a particular multiphasic mode from the plurality of multiphasic modes; and
providing, based on the selection, a corresponding control signal to a motor, the corresponding control signal instructing the motor to operate in the selected multiphasic mode,
wherein the motor is operatively coupled to a driveshaft to rotate the driveshaft, and further to rotate a punch tool directly coupled to a distal end of the driveshaft to rotate therewith,
wherein the punch tool is arranged to be in physical contact with a skin layer during operation of the extraction device, and
wherein a force sensor is operatively coupled to the driveshaft to measure a force exerted thereupon by the skin layer.

13. The method claim 12, wherein the selected multiphasic mode comprising a first rotary mode and a second rotary mode, the method further comprising:
during operation of the device in the selected multiphasic mode, receiving a first sensor signal from the force sensor;
performing a first selection of the first rotary mode from the plurality of rotary modes, the first selection being based on the first sensor signal;
providing, based on the first selection, a first control signal to the motor, the first control signal instructing the motor to operate in the first rotary mode;
receiving a second sensor signal from the force sensor;
performing a second selection of the second rotary mode from the plurality of rotary modes, the second selection being based on the second sensor signal; and
providing, based on the second selection, a second control signal to the motor, the second control signal instructing the motor to operate in the second rotary mode.

14. The method of claim 13, wherein each rotary mode in the plurality of rotary modes corresponds to a different type of skin layer.

15. The method of claim 13, further comprising:
performing a first determination, based on the first sensor signal, that the punch tool is in direct contact with a first skin layer type, the first selection of the first rotary mode being based on the first determination; and performing a second determination, based on the second sensor signal, that the punch tool is in direct contact with a second skin layer type, the second selection of the second rotary mode being based on the second determination.

16. The method of claim 15, wherein the first sensor signal is indicative of a first level of force exerted by the first skin layer type against the punch tool and the second sensor signal is indicative of a second level of force exerted by the second skin layer type against the punch tool.

17. The method of claim 12, wherein the selection of a particular multiphasic mode is a user selection received through a user interface.

18. The method of claim 17, wherein a currently active multiphasic mode comprises a plurality of available rotary modes, the method further comprising:
   providing to the user interface a plurality of indications, the plurality of indications comprising an indication of a real-time sensor signal, a real-time indication of the currently active multiphasic mode, a real-time indication of a currently active rotary mode from the plurality of available rotary modes from the selected multiphasic mode, and an indication of the plurality of available rotary modes, the user interface being configured to display the at least one of the plurality of indications.

19. The method of claim 18, wherein the plurality of indications further comprises:
   a first graph of the real-time sensor signal as a function of elapsed time; and
   a second graph of a pre-determined signal over time as an overlay to the first graph.

20. The method of claim 17, wherein a currently active multiphasic mode comprises a plurality of available rotary modes,
   wherein a first rotary mode in the plurality of available rotary modes has a maximum operation time, a start force threshold at which the first rotary mode is activated, and an end force threshold at which the first rotary mode is deactivated, and
wherein the method further comprises:
   receiving a first measurement from the force sensor of a first force exerted upon the driveshaft by the skin layer;
   making a first determination, based on the first measurement, that the first force has exceeded the start force threshold, and based on the first determination, activate the first rotary mode;
   receiving a second measurement from the force sensor of a second force exerted upon the driveshaft by the skin layer;
   making a second determination, based on the second measurement, that the second force has fallen below the end force threshold, and based on the second determination, deactivate the first rotary mode;
   making a third determination that the first rotary mode has been activated for longer than the maximum operation time, and based on the third determination, deactivate the first rotary mode; and
   providing to the user interface a plurality of indications, the plurality of indications comprising an indication of the plurality of available rotary modes, and for each available rotary mode, the maximum operation time, the start force threshold, the end force threshold, the first measurement from the force sensor, and the second measurement from the force sensor, the user interface being configured to display the at least one of the plurality of indications.

21. The method of claim 12, wherein the plurality of rotary modes comprise:
   a rotational movement in which the driveshaft rotates in a single direction at a designated rotational speed, the direction being one of a clockwise direction and a counter-clockwise direction, and
   an oscillation movement in which the driveshaft alternates between rotating in a clockwise direction and a counterclockwise direction, through a designated angle of rotation at a designated rotational speed.

22. The method of claim 12, wherein the force sensor is a load cell, the load cell comprising an elastic member and a strain gauge, the strain gauge being communicatively coupled to the controller.

* * * * *